(12) United States Patent
Aoyama et al.

(10) Patent No.: US 11,274,395 B2
(45) Date of Patent: Mar. 15, 2022

(54) FIBER ASSEMBLY-FORMING METHOD AND FIBER ASSEMBLY-FORMING APPARATUS

(71) Applicant: SEIKO EPSON CORPORATION, Tokyo (JP)

(72) Inventors: Tetsuya Aoyama, Nagano (JP); Shigemi Wakabayashi, Nagano (JP); Kaneo Yoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/893,514

(22) Filed: Jun. 5, 2020

(65) Prior Publication Data
US 2020/0385924 A1 Dec. 10, 2020

(30) Foreign Application Priority Data

Jun. 7, 2019 (JP) .............................. JP2019-106992

(51) Int. Cl.
| | | |
|---|---|---|
| *D21B 1/08* | (2006.01) | |
| *D21B 1/06* | (2006.01) | |
| *D21C 5/02* | (2006.01) | |
| *D21D 5/24* | (2006.01) | |
| *D21F 9/02* | (2006.01) | |
| *D21G 9/00* | (2006.01) | |
| *D21H 11/14* | (2006.01) | |
| *D21F 7/06* | (2006.01) | |
| *B29L 7/00* | (2006.01) | |

(52) U.S. Cl.
CPC ............... *D21B 1/08* (2013.01); *D21B 1/063* (2013.01); *D21C 5/025* (2013.01); *D21D 5/24* (2013.01); *D21F 7/06* (2013.01); *D21F 9/02* (2013.01); *D21G 9/0027* (2013.01); *D21H 11/14* (2013.01); *B29L 2007/008* (2013.01)

(58) Field of Classification Search
USPC ....................................................... 162/261
See application file for complete search history.

(56) References Cited

U.S. PATENT DOCUMENTS 8,882,965 B2    11/2014   Yamagami et al.

FOREIGN PATENT DOCUMENTS

| JP | 07-003603 A | 1/1995 |
|---|---|---|
| JP | 08-072256 A | 3/1996 |
| JP | 2012-144819 A | 8/2012 |

*Primary Examiner* — Mark Halpern
(74) *Attorney, Agent, or Firm* — Global IP Counselors, LLP

(57) ABSTRACT

A fiber assembly-forming method includes forming a web containing a plurality of fibers charged to a first polarity on a transport belt charged to a second polarity opposite to the first polarity and applying a liquid to the web formed on the transport belt from a nozzle of a liquid coater. The liquid contains a binder binding the fibers.

8 Claims, 5 Drawing Sheets

| LIQUID | | L1 | L2 | L3 |
|---|---|---|---|---|
| WATER-SOLUBLE RESIN | PVA | 14 | - | - |
| | PAM | - | 14 | - |
| THERMOPLASTIC RESIN | PU | - | - | 14 |
| PENETRANT | E1010 | 1 | 1 | 1 |
| WATER | | BALANCE | BALANCE | BALANCE |
| TOTAL | | 100 | 100 | 100 |

[Figure 9]

| LIQUID APPLICATION AMOUNT | | WATER FRACTION | VOLUME RESISTIVITY | SEPARATION PROPERTIES | DRYING PROPERTIES |
|---|---|---|---|---|---|
| [g/A4] | [g/m²] | [%] | [Ω·m] | | |
| 0 | 0 | 5.4 | $3.55 \times 10^{12}$ | C | A |
| 1.0 | 16 | 9.1 | $2.3 \times 10^{10}$ | C | A |
| 1.2 | — | 11.0 | $2.6 \times 10^{9}$ | C | A |
| 1.5 | 24 | 13.4 | $1.6 \times 10^{8}$ | C | A |
| 1.7 | — | 15.0 | $2.7 \times 10^{7}$ | B | A |
| 2.0 | 32 | 17.7 | $1.1 \times 10^{6}$ | A | A |
| 2.3 | — | 20.0 | $8.3 \times 10^{4}$ | A | A |
| 3.0 | 48 | 26.4 | $5.3 \times 10^{1}$ | A | A |
| 4.0 | 64 | 35.0 | $2.6 \times 10^{-3}$ | A | A |
| 5.0 | 80 | 43.7 | $1.3 \times 10^{-7}$ | A | B |
| 5.2 | — | 45.0 | $2.8 \times 10^{-8}$ | A | B |
| 6.0 | 96 | 52.3 | $6.1 \times 10^{-12}$ | A | C |

FIBER ASSEMBLY-FORMING METHOD AND FIBER ASSEMBLY-FORMING APPARATUS

The present application is based on, and claims priority from JP Application Serial Number 2019-106992, filed Jun. 7, 2019, the disclosure of which is hereby incorporated by reference herein in its entirety.

BACKGROUND

1. Technical Field

The present disclosure relates to a fiber assembly-forming method and a fiber assembly-forming apparatus.

2. Related Art

A method for forming a fiber assembly by binding fibers with resin is known.

For example, JP-A-7-3603 describes that a raw material mixture containing waste paper fibers obtained by disintegrating waste paper in a dry mode is deposited on an endless belt and a binder solution is sprayed from a spray nozzle placed above the endless belt.

However, as described in JP-A-7-3603, when the waste paper fibers are being transported with the endless belt, the waste paper fibers rise from the endless belt in the form of a paper power to block the spray nozzle in some cases.

SUMMARY

According to an aspect of the present disclosure, a fiber assembly-forming method includes forming a web containing a plurality of fibers charged to a first polarity on a transport belt charged to a second polarity opposite to the first polarity and applying a liquid to the web formed on the transport belt from a nozzle of a liquid coater. The liquid contains a binder binding the fibers.

In the fiber assembly-forming method, the liquid may contain water and the water fraction of the web coated with the liquid may be 15.0% or more.

In the fiber assembly-forming method, the water fraction may be 17.7% to 35.0%.

The fiber assembly-forming method may further include disintegrating a feedstock containing a plurality of fibers. In the formation of the web on the transport belt, the web may be formed by depositing disintegrated matter obtained by disintegrating the feedstock on the transport belt.

The fiber assembly-forming method may further include enhancing the charge of the fibers contained in the web formed on the transport belt.

The fiber assembly-forming method may further include pressurizing the web formed on the transport belt by a pressurizing portion before the liquid is applied to the web. The pressurizing portion may include a first calender roller in contact with the web and a second calender roller in contact with the transport belt. The first calender roller may be charged to the first polarity. The second calender roller may be grounded.

In the fiber assembly-forming method, the liquid coater may be an ink jet head.

According to an aspect of the present disclosure, a fiber assembly-forming apparatus includes a transport belt on which a web containing a plurality of fibers charged to a first polarity is formed and which is charged to a second polarity opposite to the first polarity and a liquid coater applying a liquid to the web formed on the transport belt from a nozzle. The liquid contains a binder binding the fibers.

In the fiber assembly-forming apparatus, the liquid may contain water and the water fraction of the web coated with the liquid may be 15.0% or more.

In the fiber assembly-forming apparatus, the water fraction may be 17.7% to 35.0%.

The fiber assembly-forming apparatus may further include a disintegration section disintegrating a feedstock containing a plurality of fibers and a deposition section depositing disintegrated matter obtained by disintegrating the feedstock on the transport belt to form the web on the transport belt.

The fiber assembly-forming apparatus may further include a charge enhancement section enhancing the charge of the fibers contained in the web formed on the transport belt.

The fiber assembly-forming apparatus may further include a pressurizing portion pressurizing the web formed on the transport belt before the liquid is applied to the web. The pressurizing portion may include a first calender roller in contact with the web and a second calender roller in contact with the transport belt. The first calender roller may be charged to the first polarity. The second calender roller may be grounded.

In the fiber assembly-forming apparatus, the liquid coater may be an ink jet head.

DESCRIPTION OF EXEMPLARY EMBODIMENTS

Preferred embodiments of the present disclosure will now be described in detail with reference to the accompanying drawings. The embodiments below do not unfairly limit the scope of the present disclosure that is recited in the claims.

All of components described below are not necessarily essential elements of the present disclosure.

1. FIBER ASSEMBLY-FORMING APPARATUS

1.1. Overall Configuration

Figure 1:
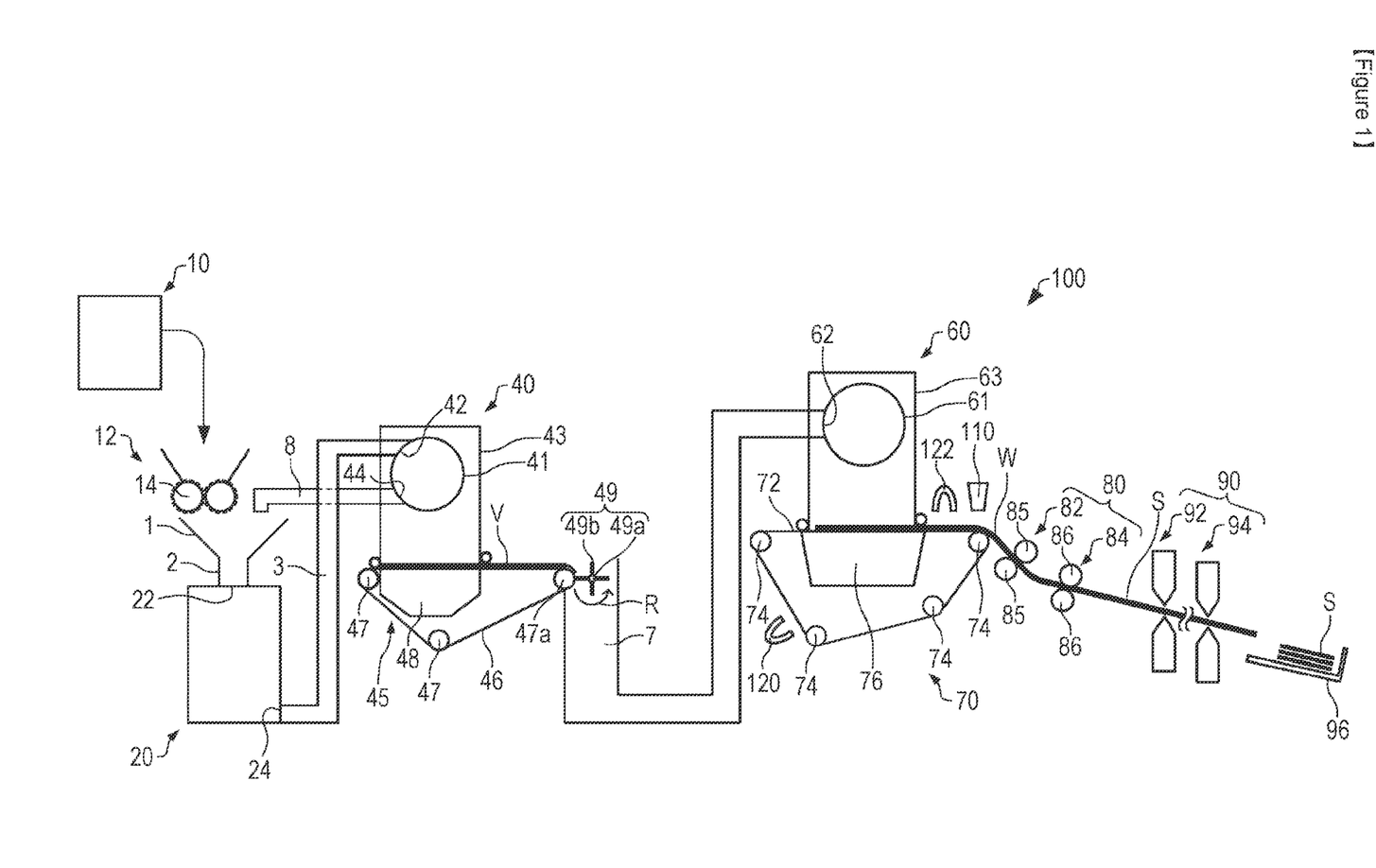
FIG. 1 is a schematic view of a fiber assembly-forming apparatus according to an embodiment of the present disclosure.

A fiber assembly-forming apparatus 100 according to an embodiment of the present disclosure is described with reference to drawings. FIG. 1 is a schematic view of the fiber assembly-forming apparatus 100.

As shown in FIG. 1, the fiber assembly-forming apparatus 100 includes a supply section 10, a rough crushing section 12, a disintegration section 20, a screening section 40, a first web-forming section 45, a rotator 49, a deposition section 60, a second web-forming section 70, a sheet-forming section 80, a cutting section 90, a liquid coater 110, a charging section 120, and a charge enhancement section 122.

The supply section 10 supplies a feedstock to the rough crushing section 12. The supply section 10 is, for example, an automatic input section for continuously inputting the feedstock to the rough crushing section 12. The feedstock supplied by the supply section 10 contains, for example, fibers of waste paper, pulp sheets, or the like.

The rough crushing section 12 cuts the feedstock supplied by the supply section 10 into small pieces in gas, such as air. The small pieces are, for example, several centimeters square pieces. In an illustrated example, the rough crushing section 12 includes rough crushing blades 14 and can cut the input feedstock with the rough crushing blades 14. The rough crushing section 12 used is, for example, a shredder. The feedstock cut by the rough crushing section 12 is received in a hopper 1 and is then transferred to the disintegration section 20 through a pipe 2.

The disintegration section 20 disintegrates the feedstock cut by the rough crushing section 12. The term "disintegrate" as used herein means that a feedstock containing a plurality of bound fibers is disentangled one by one. The disintegration section 20 has the function of removing substances, such as resin particles, ink, toner, and a bleeding inhibitor, adhering to the feedstock from fibers.

One having passed through the disintegration section 20 is referred to as "disintegrated matter". The "disintegrated matter" contains disentangled disintegrated fibers and also contains resin particles separated from fibers when the fibers are disintegrated, a colorant such as ink or toner, or an additive such as a bleeding inhibitor or a paper strength additive in some cases. Disentangled disintegrated matter is string-shaped. The disentangled disintegrated matter may be present in such a state that the disentangled disintegrated matter is not intertwined with other disentangled fibers, that is, such a state that the disentangled disintegrated matter is independent or in such a state that the disentangled disintegrated matter is intertwined with other disentangled fibers to form aggregates, that is, such a state that the disentangled disintegrated matter forms lumps.

The disintegration section 20 performs disintegration in a dry mode. Herein, performing treatment such as disintegration in gas, such as air, rather than liquid is referred to as a dry mode. The disintegration section 20 used is, for example, an impeller mill. The disintegration section 20 has the function of generating such an air flow that sucks the feedstock and discharges the disintegrated matter. This enables the disintegration section 20 to suck the feedstock from an inlet 22 together with an air flow by means of an air flow generated by the disintegration section 20, to disintegrate the feedstock, and to transport the disintegrated matter to an outlet 24. The disintegrated matter having passed through the disintegration section 20 is transferred to the screening section 40 through a pipe 3. Incidentally, an air flow for transporting the disintegrated matter from the disintegration section 20 to the screening section 40 may use the air flow generated by the disintegration section 20 or an air flow generated by an air flow generator such as a blower.

The screening section 40 imports the disintegrated matter obtained in the disintegration section 20 from an inlet 42 and screens the disintegrated matter depending on the length of fibers. The screening section 40 includes a drum portion 41 and a housing portion 43 that houses the drum portion 41. The drum portion 41 used is, for example, a sieve. The drum portion 41 includes a net and can separate fibers or particles smaller in size than openings of the net, that is, first screened fractions passing through the net, and fibers, undisintegrated pieces, or lumps larger in size than the openings of the net, that is, second screened fractions not passing through the net. For example, the first screened fractions are transferred to the deposition section 60 through a pipe 7. The second screened fractions are returned to the disintegration section 20 from an outlet 44 through a pipe 8. In particular, the drum portion 41 is a cylindrical sieve rotationally driven with a motor. The net of the drum portion 41 used is, for example, a metal gauze, an expanded metal obtained by expanding a slit metal plate, or a punching metal obtained by forming holes in a metal plate with a press or the like.

The first web-forming section 45 transports the first screened fractions having passed through the screening section 40 to a mixing section 50. The first web-forming section 45 includes a mesh belt 46, tension rollers 47, and a suction mechanism 48.

The suction mechanism 48 can suck the first screened fractions which has passed through openings of the screening section 40 and which has been distributed in air onto the mesh belt 46. The first screened fractions are deposited on the moving mesh belt 46 to form a web V. The basic configuration of the mesh belt 46, the tension rollers 47, and the suction mechanism 48 is substantially the same as that of a mesh belt 72, tension rollers 74, and suction mechanism 76 of the second web-forming section 70 as described below.

The web V passes through the screening section 40 and the first web-forming section 45 and is thereby formed in such a state that the web V contains a lot of air, is soft, and is bulgy. The web V deposited on the mesh belt 46 is input to the pipe 7 and is transported to the deposition section 60.

The rotator 49 can cut the web V. In the illustrated example, the rotator 49 includes a base portion 49a and protruding portions 49b protruding from the base portion 49a. The protruding portions 49b have, for example, a plate shape. In the illustrated example, the number of the protruding portions 49b is four and the four protruding portions 49b are arranged at equal intervals. The base portion 49a rotates in a direction R and therefore the protruding portions 49b can rotate about the base portion 49a. For example, the change in amount of the disintegrated matter supplied to the deposition section 60 per unit time can be reduced in such a manner that the web V is cut by the rotator 49.

The rotator 49 is placed in the vicinity of the first web-forming section 45. In the illustrated example, the rotator 49 is placed in the vicinity of a tension roller 47a located downstream in the path of the web V. The rotator 49 is placed at a position where the protruding portions 49b can come into contact with the web V and where the protruding portions 49b do not come into contact with the mesh belt 46 on which the web V is deposited. This enables the mesh belt 46 to be inhibited from being worn by the protruding portions 49b. The shortest distance between the protruding portions 49b and the mesh belt 46 is, for example, 0.05 mm to 0.5 mm. This is the distance that the web V can be cut without damaging the mesh belt 46.

The deposition section 60 imports the first screened fractions from an outlet 62, disentangles the intertwined disintegrated matter, and sprays the intertwined disintegrated matter in air so as to be dispersed. The deposition section 60 can uniformly deposit the first screened fractions on the second web-forming section 70.

The deposition section 60 includes a drum portion 61 and a housing portion 63 that houses the drum portion 61. The drum portion 61 used is, for example, a rotary cylindrical sieve. The drum portion 61 includes a net and sprays fibers or particles smaller in size than openings of the net. The configuration of the drum portion 61 is the same as, for example, the configuration of the drum portion 41.

Incidentally, the "sieve" of the drum portion 61 need not have the function of screening a specific target. That is, the "sieve" used as the drum portion 61 means one equipped with a net. The drum portion 61 may spray all of a mixture imported in the drum portion 61.

The second web-forming section 70 deposits a passing object having passed through the deposition section 60 to form a web W. The second web-forming section 70 includes, for example, a mesh belt 72, tension rollers 74, and a suction mechanism 76.

The mesh belt 72 allows the passing object having passed through an opening of the deposition section 60 to be deposited thereon while moving. The mesh belt 72 is tensioned by the tension rollers 74 and is configured such that the passing object is unlikely to pass through the mesh belt 72 and air passes through the mesh belt 72. The mesh belt 72 moves because the tension rollers 74 rotate. The passing object having passed through the deposition section 60 is deposited on the mesh belt 72 that is continuously moving, whereby the web W is formed on the mesh belt 72.

The suction mechanism 76 is placed under the mesh belt 72. The suction mechanism 76 can generate an air flow directed downward. A mixture dispersed in air by the deposition section 60 can be sucked on the mesh belt 72 by the suction mechanism 76. This enables the discharge rate from the deposition section 60 to be increased. Furthermore, a down-flow can be formed in the fall path of the mixture by the suction mechanism 76, thereby enabling the disintegrated matter and an additive to be prevented from being intertwined during falling.

As described above, passing through the deposition section 60 and the second web-forming section 70 allows the web W to be formed in such a state that the web W contains a lot of air, is soft, and is bulgy. The web W deposited on the mesh belt 72 is transported to the sheet-forming section 80.

The liquid coater 110 applies a liquid containing a binder binding a plurality of fibers to the web W. Details of the liquid coater 110, the charging section 120, and the charge enhancement section 122 are described below.

The sheet-forming section 80 pressurizes and heats the web W deposited on the mesh belt 72 to form a sheet S. In the sheet-forming section 80, a mixture of the disintegrated matter and binder mixed together in the web W is heated, thereby enabling a plurality of fibers in the mixture to be bound to each other with the binder.

The sheet-forming section 80 includes a pressurizing portion 82 pressurizing the web W and a heating portion 84 heating the web W pressurized by the pressurizing portion 82. The pressurizing portion 82 is composed of a pair of calender rollers 85 and applies a pressure to the web W. Pressurizing the web W reduces the thickness of the web W and increases the bulk density of the web W. The heating portion 84 used is, for example, a heating roller, a hot press molding machine, a hotplate, a hot air blower, an infrared heater, or a flash-fusing system. In the illustrated example, the heating portion 84 includes a pair of heating rollers 86. Configuring the heating portion 84 using the heating rollers 86 enables the sheet S to be formed in such a manner that the web W is continuously transported in comparison with configuring the heating portion 84 using a plate-shaped press. The calender rollers 85 and the heating rollers 86 are placed such that, for example, the axes of rotation thereof are parallel. Herein, the calender rollers 85 can apply a pressure higher than the pressure applied to the web W by the heating rollers 86 to the web W. Incidentally, the number of the calender rollers 85 and the number of the heating rollers 86 are not particularly limited.

The cutting section 90 cuts the sheet S formed by the sheet-forming section 80. In the illustrated example, the cutting section 90 includes a first cutting portion 92 cutting the sheet S in a direction crossing the transport direction of the sheet S and a second cutting portion 94 cutting the sheet S in a direction parallel to the transport direction thereof. The second cutting portion 94 cuts the sheet S having passed through, for example, the first cutting portion 92.

The above allows the sheet S to be formed such that the sheet S is a single sheet with a predetermined size. The cut sheet S, which is such a single sheet, is discharged to a discharge section 96.

1.2. Configuration Surrounding Mesh Belt

Figure 2:
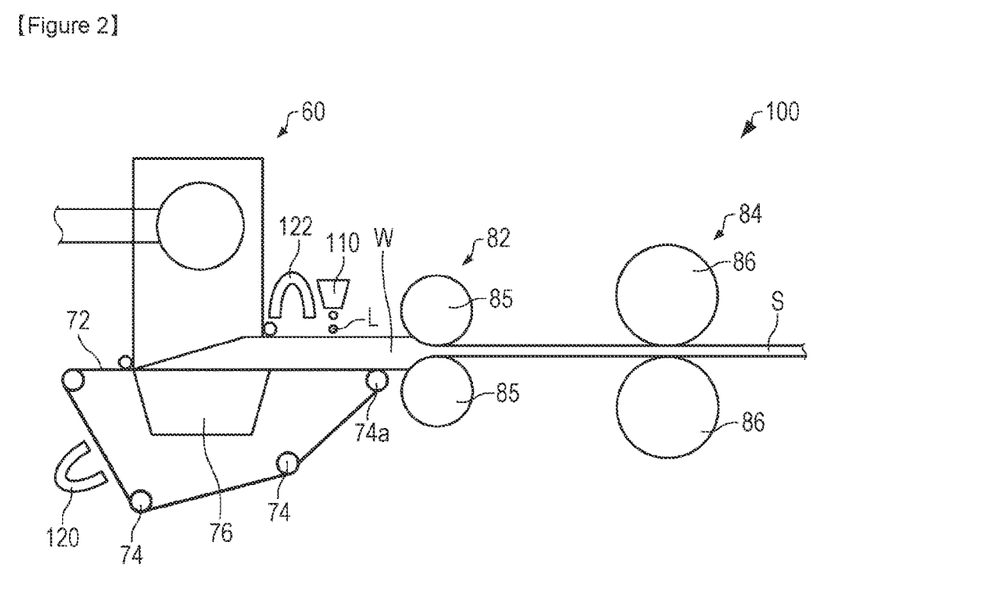
FIG. 2 is a schematic view of the fiber assembly-forming apparatus according to the embodiment.

FIG. 2 is a schematic view of the fiber assembly-forming apparatus 100 and shows surroundings of the mesh belt 72. Referring to FIG. 1, the web W is transported obliquely downward from the mesh belt 72. Referring to FIG. 2, the web W is transported from the mesh belt 72 in a horizontal direction for convenience.

As shown in FIG. 2, the deposition section 60 deposits the disintegrated matter obtained in the disintegration section 20 on the mesh belt 72 to form the web W on the mesh belt 72.

The web W contains a plurality of fibers charged to a first polarity. In a step from the disintegration section 20 to the mesh belt 72, the fibers are brought into contact with members of the fiber assembly-forming apparatus 100 and are thereby charged. The first polarity is, for example, positive and the fibers contained in the web W have a positive charge. The web W is in such a state that a plurality of fibers are unbound with the binder.

Figure 3:
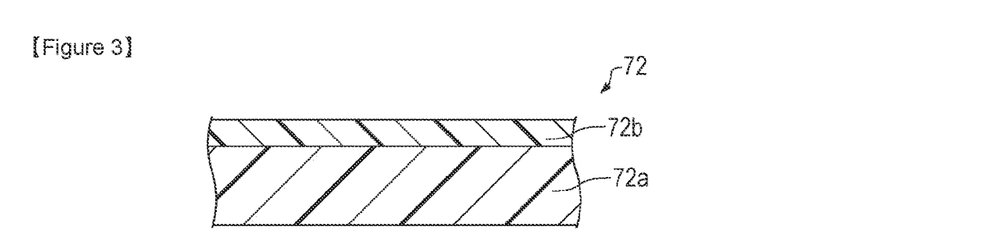
FIG. 3 is a schematic view of a mesh belt included in the fiber assembly-forming apparatus according to the embodiment.

The web W is formed on the mesh belt 72. The mesh belt 72 is a transport belt transporting the web W. FIG. 3 is a schematic view of the mesh belt 72. As shown in FIG. 3, the mesh belt 72 includes, for example, a first layer 72a and a second layer 72b placed on the first layer 72a.

The first layer 72a of the mesh belt 72 is made of, for example, polyamide containing a conductive filler. The thickness of the mesh belt 72 is, for example, 50 μm to 1,000 μm. The volume resistivity of the mesh belt 72 is, for example, $10^{10}$ Ωcm to $10^{12}$ Ωcm.

The second layer 72b of the mesh belt 72 is made of, for example, a fluorocarbon resin. The thickness of the second layer 72b is, for example, 5 μm to 100 μm. The surface resistivity of the second layer 72b is, for example, 1011 Ω/cm² to $10^{14}$ Ω/cm². The web W is formed on the second layer 72b.

Incidentally, the mesh belt 72 need not have such a two-layer structure having the first layer 72a and the second layer 72b as shown in FIG. 2 and may have a single-layer structure which has the first layer 72a and which does not have the second layer 72b. In this case, the web W is formed on the first layer 72a and the volume resistivity of the first layer 72a is, for example, $10^{10}$ Ωcm to $10^{14}$ Ωcm. The mesh belt 72 may be one obtained by embedding an electrode in an insulating belt, which is not shown.

The charging section 120 is placed in the vicinity of the mesh belt 72. The charging section 120 charges the mesh belt 72 to a second polarity. The second polarity is a polarity opposite to the first polarity. The second polarity is, for example, negative and the mesh belt 72 has a negative charge. Hereinafter, the first polarity is described as positive and the second polarity is described as negative.

The charging section 120 is, for example, a non-contact corotron or scorotron performing corona discharge. To a high-voltage power supply of the charging section 120, a direct-current voltage of, for example, negative several kilovolts to negative several tens of kilovolts is applied and a direct-current voltage of −5 kV is preferably applied. The mesh belt 72 is negatively charged with negative ions generated by discharge.

The mesh belt 72 is negatively charged by the charging section 120, whereby an electrostatic force is generated between the mesh belt 72 and positively charged fibers. This allows the web W containing the fibers to be smoothly attracted onto the mesh belt 72 and to be transported. The electrostatic force makes the fibers unlikely to be blown up by an air flow or the like, thereby enabling the generation of a paper powder to be reduced.

Incidentally, the charging section 120 is not limited to the non-contact corotron or scorotron. The charging section 120 may be, for example, a charging roller having been charged. The charging roller may be charged by friction, may be charged by applying a direct-current voltage thereto, or may be charged by applying an alternating-current voltage thereto.

The charge enhancement section 122 is placed in the vicinity of the mesh belt 72. The web W is located between the mesh belt 72 and the charge enhancement section 122. The charge enhancement section 122 enhances the charge of the fibers contained in the web W formed on the mesh belt 72. This enables the fibers to have a larger positive charge.

The charge enhancement section 122 is, for example, a non-contact corotron or scorotron performing corona discharge. To a high-voltage power supply of the charge enhancement section 122, a direct-current voltage of, for example, positive several kilovolts to positive several tens of kilovolts is applied and a direct-current voltage of +8 kV is preferably applied. The fibers are strongly positively charged with positive ions generated by discharge. This enables the electrostatic force between the mesh belt 72 and the fibers to be enhanced, thereby enabling the generation of a paper powder to be reduced.

The liquid coater 110 applies liquid L to the web W formed on the mesh belt 72 from a nozzle. The liquid coater 110 is, for example, an ink jet head, a spray, or the like and is preferably the ink jet head. When the liquid coater 110 is the ink jet head, the liquid L can be uniformly applied to the web W. The bulk density of the web W uncoated with the liquid L is preferably 0.09 g/cm³ to 0.80 g/cm³. When the bulk density of the web W uncoated with the liquid L is within this range, the liquid L is allowed to penetrate into the web W by capillary action.

The positive charge of the fibers contained in the web W and the negative charge of the mesh belt 72 are reduced by the liquid L, whereby the electrostatic force between the fibers and the mesh belt 72 is reduced. In this state, the web W moves toward a tension roller 74a. The tension roller 74a is a small-sized roller which preferably has a diameter of 30 mm or less and more preferably 15 mm or less. The tension roller 74a is grounded. The web W is separated from the mesh belt 72 at the tension roller 74a and enters the pressurizing portion 82. The tension roller 74a is a separation roller for separating the web W from the mesh belt 72.

1.3. Liquid Applied to Web from Liquid Coater

The liquid L, which is applied to the web W from the liquid coater 110, contains the binder, which binds a plurality of fibers. The binder, which is contained in the liquid L, is, for example, a water-soluble resin, a thermoplastic resin, or a thermosetting resin.

Examples of the water-soluble resin include polyacrylamide; polyvinyl alcohol; polyvinylpyrrolidone; cellulose derivatives such as carboxymethylcellulose, hydroxymethylcellulose, and agar; starches such as dextrin; gelatin; glue; and casein. Incidentally, polyacrylamide, polyvinyl alcohol, and polyvinylpyrrolidone are also thermoplastic resins.

Examples of the thermoplastic resin include styrene-butadiene copolymers, acrylonitrile-butadiene copolymers, acrylate copolymers, styrene-acrylic acid copolymers, polyurethane, polyethylene, polyester, polyvinyl acetate, ethylene-vinyl acetate copolymers, polyacrylamide, polyvinyl alcohol, and polyvinylpyrrolidone.

Examples of the thermosetting resin include epoxy resins, phenol resins, urea resins, melamine resins, unsaturated polyester resins, alkyd resins, diallyl phthalate resins, vinyl ester resins, and thermosetting polyimides.

The liquid L may contain one or more of the above resins. Incidentally, in consideration of readily discharging the liquid L from the liquid coater 110, the liquid L is preferably emulsion.

The glass transition temperature of the thermoplastic resin or thermosetting resin contained in the liquid L is, for example, −50° C. to 130° C. and is preferably −30° C. to 100° C. When glass transition temperature thereof is within this range, the binding force of the fibers can be enhanced and the paper strength of the sheet S can be increased.

The content of the binder in the liquid L is, for example, 0.1% by mass to 30.0% by mass and is preferably 0.1% by mass to 20.0% by mass. When the content thereof is 0.1% by mass to 30.0% by mass, the viscosity of the liquid L can be reduced such that the liquid L can be sufficiently discharged from the liquid coater 110.

The fibers contained in the web W are heated with the heating portion 84 and are thereby bound with the binder, which is contained in the liquid L. Incidentally, the web W provided with the liquid L may be heated separately using hot air, an infrared ray, an electromagnetic wave, a hot roller, a hot press, or the like, which is not shown, in addition to the heating portion 84. This enables the melt bonding or gelatinization of the binder, which is contained in the liquid L, to be facilitated and enables the removal of water and the like to be facilitated.

The surface tension of the liquid L is preferably 50 mN/m or less at 20° C., more preferably 20 mN/m to 50 mN/m, and further more preferably 45 mN/m to 50 mN/m. When the surface tension of the liquid L is 50 mN/m or less at 20° C., the liquid L can penetrate into the web W.

The viscosity of the liquid L is preferably 8.0 mPa·s at 20° C. When the viscosity of the liquid L is more than 8.0 mPa·s, it is difficult to discharge the liquid L from the liquid coater 110 in some cases because the viscosity thereof is too high.

The liquid L may contain a penetrant. This enables the penetration of the liquid L into the web W to be enhanced. Examples of the penetrant include glycol ethers such as triethylene glycol monobutyl ether, triethylene glycol dimethyl ether, triethylene glycol diethyl ether, triethylene glycol dibutyl ether, and triethylene glycol methyl butyl ether; silicone surfactants; acetylene glycol surfactants; acetylene alcohol surfactants; and fluorinated surfactants. The liquid L may contain one or more of these penetrants.

The content of the penetrant in the liquid L is, for example, 0.1% by mass to 30.0% by mass and is preferably 0.1% by mass to 20.0% by mass. When the content thereof is 0.1% by mass to 30.0% by mass, the penetration of the liquid L into the web W can be facilitated, thereby enabling the paper strength of the sheet S to be increased.

The liquid L may contain a humectant. This enables that the clogging of a nozzle of the liquid coater 110 is unlikely to occur when the liquid L is discharged. Examples of the humectant include diethylene glycol, triethylene glycol, propylene glycol, dipropylene glycol, 1,3-propanediol, 1,3-butylene glycol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 1,2-hexanediol, 2-ethyl-1,3-hexanediol, 3-methyl-1,5-pentanediol, 2-methylpentane-2,4-diol, trimethylolpropane, and glycerin. The liquid L may contain one or more of these humectants.

The content of the humectant in the liquid L is, for example, 1.0% by mass to 30.0% by mass, preferably 3.0% by mass to 20.0% by mass, and more preferably 5.0% by mass to 16.0% by mass. When the content thereof is 1.0% by mass to 30.0% by mass, the clogging of the nozzle of the liquid coater 110 can be sufficiently reduced.

The liquid L contains water. Examples of water include pure water products such as ion-exchanged water, ultrafiltered water, reverse osmosis-purified water, and distilled water and ultrapure water. Water sterilized by ultraviolet irradiation or the addition of hydrogen peroxide or the like prevents the growth of fungi or bacteria, can be stored for a long period of time, and is therefore preferable. Since the liquid L contains water, the liquid L can reduce the positive charge of the fibers and the negative charge of the mesh belt 72 as described above.

The water fraction of the web W coated with the liquid L is, for example, 15.0% or more, preferably 17.7% to 45.0%, and more preferably 17.7% to 35.0%. When the water fraction of the web W coated with the liquid L is 15.0% or more, the web W can be readily separated from the mesh belt 72 by applying the liquid L to the web W. Furthermore, when the water fraction of the web W coated with the liquid L is 45.0% or less, the energy used to dry the web W can be reduced.

The volume resistivity of the web W coated with the liquid L is, for example, $2.7 \times 10^7$ Ωcm or less, preferably $2.8 \times 10^{-8}$ Ωcm to $1.1 \times 10^6$ Ωcm, and more preferably $2.6 \times 10^{-3}$ Ωcm to $1.1 \times 10^6$ Ωcm. The volume resistivity of the web W is inversely proportional to the water fraction of the web W.

The amount of the liquid L applied to the web W is, for example, 1.7 g or more per A4 size, preferably 2.0 g to 5.2 g, and more preferably 2.0 g to 4.0 g. The amount of the liquid L applied to the web W is proportional to the water fraction of the web W.

Examples of another additive that can be contained in the liquid L include an ultraviolet absorber, a photo-fixing agent, a quencher, an oxidation inhibitor, a water resistant additive, an antimildew agent, a preservative, a thickening agent, a flow improver, a pH adjustor, an antifoam, a foam inhibitor, a leveling agent, and an antistatic agent.

1.4. Effects

The fiber assembly-forming apparatus 100 has, for example, effects below.

The fiber assembly-forming apparatus 100 includes the mesh belt 72, on which the web W containing the fibers charged to the first polarity is formed and which is charged to the second polarity opposite to the first polarity, and the liquid coater 110, which applies the liquid L to the web W formed on the mesh belt 72 from the nozzle. The liquid L contains the binder, which binds the fibers.

Therefore, in the fiber assembly-forming apparatus 100, an electrostatic force is generated between the mesh belt 72 and the positively charged fibers. This makes the fibers unlikely to be blown up while the web W containing the fibers is being transported on the mesh belt 72, thereby enabling the generation of a paper powder to be reduced. Thus, the possibility that the paper powder adheres to the nozzle of the liquid coater 110 can be reduced. If the paper powder adheres to the nozzle, no liquid is discharged from the nozzle provided with the paper powder, that is, a dot defect occurs. This reduces the binding of the fibers, leading to the deterioration of the tensile strength thereof. Furthermore, in a case where the paper powder adhering to the nozzle is removed, it is necessary that the liquid coater 110 is temporarily stopped and is cleaned, brushing causes spoiled paper, and therefore there is a problem with productivity. In the fiber assembly-forming apparatus 100, this problem can be avoided.

In the fiber assembly-forming apparatus 100, the liquid L contains water and the water fraction of the web W coated with the liquid L may be 15.0% or more. Therefore, in the fiber assembly-forming apparatus 100, the web W can be readily separated from the mesh belt 72 by applying the liquid L to the web W.

In the fiber assembly-forming apparatus 100, the water fraction of the web W coated with the liquid L may be 17.7% to 35.0%. Therefore, in the fiber assembly-forming apparatus 100, the web W can be readily separated from the mesh belt 72 by applying the liquid L to the web W and the energy used to dry the web W can be reduced.

The fiber assembly-forming apparatus 100 includes the disintegration section 20, which disintegrates the feedstock containing the fibers, and the deposition section 60, which deposits the disintegrated matter on the mesh belt 72 to form the web W on the mesh belt 72. Therefore, in the fiber assembly-forming apparatus 100, for example, waste paper can be recycled.

The fiber assembly-forming apparatus 100 includes the charge enhancement section 122, which enhances the charge of the fibers contained in the web W formed on the mesh belt 72. Therefore, in the fiber assembly-forming apparatus 100, the electrostatic force between the mesh belt 72 and the fibers can be enhanced, thereby enabling the generation of the paper powder to be further reduced.

In the fiber assembly-forming apparatus 100, the liquid coater 110 is the ink jet head. Therefore, in the fiber assembly-forming apparatus 100, the liquid L can be uniformly applied to the web W.

In the above example, the first polarity has been described as positive and the second polarity has been described as negative. The first polarity may be negative and the second polarity may be positive.

2. MODIFICATIONS OF FIBER ASSEMBLY-FORMING APPARATUS

2.1. First Modification

Figure 4:
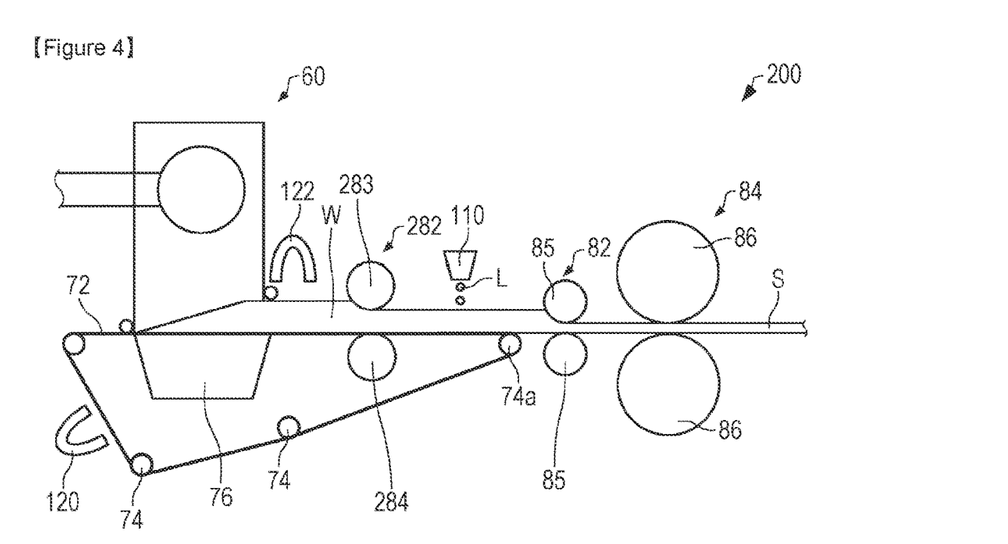
FIG. 4 is a schematic view of a fiber assembly-forming apparatus according to a first modification of the embodiment.

Next, a fiber assembly-forming apparatus 200 according to a first modification of this embodiment is described with reference to a drawing. FIG. 4 is a schematic view of the fiber assembly-forming apparatus 200.

Hereinafter, in the fiber assembly-forming apparatus 200, what is different from the above-mentioned fiber assembly-forming apparatus 100 is described and what is common thereto is omitted. This applies to a fiber assembly-forming apparatus, described below, according to a second modification of this embodiment.

The fiber assembly-forming apparatus 200 differs from the fiber assembly-forming apparatus 100 in that the fiber assembly-forming apparatus 200 includes a pressurizing portion 282 as shown in FIG. 4.

The pressurizing portion 282 pressurizes a web W formed on a mesh belt 72 before liquid L is applied to the web W. The pressurizing portion 282 may apply a pressure lower than the pressure applied to the web W by a pressurizing portion 82 to the web W. The bulk density of the web W is increased by the pressurizing portion 282. This enables the liquid L to penetrate into the web W by capillary action. Furthermore, the web W can be fed into a heating portion 84 in such a state that the web W has increased heat conductivity.

The pressurizing portion 282 includes calender rollers 283 and 284. The calender roller 283 is located outside the mesh belt 72. The calender roller 284 is located inside the mesh belt 72. The calender roller 283 is a first calender roller in contact with the web W. The calender roller 284 is a second calender roller in contact with the mesh belt 72.

The calender roller 283 is configured by coating a surface of, for example, a metal core with an insulating material such as nylon. The metal core of the calender roller 283 is connected to a positive high-voltage power supply. The calender roller 283 is positively charged. The calender roller 284 is a roller with a resistance of, for example, $10^6 \Omega$ or less. The calender roller 284 is grounded.

A potential bias acts between the calender rollers 283 and 284. On the other hand, since the web W is positively charged, electrostatic repulsion acts such that the web W does not adhere to a surface of the calender roller 283; hence, the web W can be transferred to the mesh belt 72 side.

2.2. Second Modification

Figure 5:
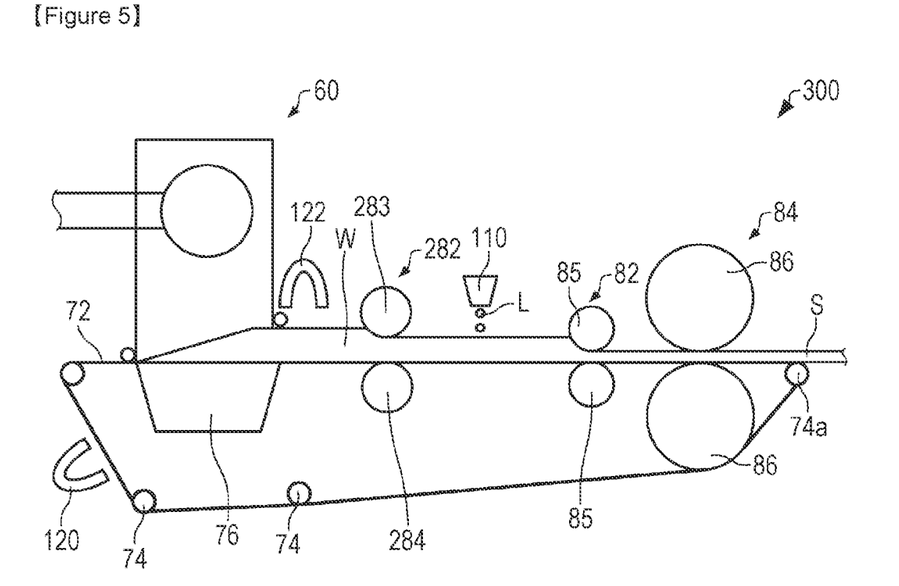
FIG. 5 is a schematic view of a fiber assembly-forming apparatus according to a second modification of the embodiment.

Next, a fiber assembly-forming apparatus 300 according to a second modification of this embodiment is described with reference to drawings. FIG. 5 is a schematic view of the fiber assembly-forming apparatus 300.

The fiber assembly-forming apparatus 300 differs from the above-mentioned fiber assembly-forming apparatus 100 in that after a sheet S is formed by heating a web W by a heating portion 84, the sheet S is separated from a mesh belt 72 as shown in FIG. 5. In an illustrated example, the fiber assembly-forming apparatus 300, as well as the above-mentioned fiber assembly-forming apparatus 200, includes a pressurizing portion 282.

In the fiber assembly-forming apparatus 300, the heating portion 84 heats the web W formed on the mesh belt 72. This enables fibers to be smoothly separated from the mesh belt 72 in the form of the sheet S. Therefore, the possibility that the fibers or liquid L is removed from the sheet S by vibration during separation or transportation after separation can be reduced in comparison with a case where the fibers are separated from the mesh belt 72 in the form of the web W. This allows most of input materials to be used to form the sheet S and therefore the input materials are not wasted. Furthermore, a failure that the sheet S wraps around a tension roller 74a is unlikely to occur and the yield can be increased.

When a first layer 72a of the mesh belt 72 is made of, for example, polyamide containing a conductive filler, the mesh belt 72 has heat resistance. Therefore, even though the heating portion 84 heats the web W formed on the mesh belt 72, the mesh belt 72 is not burned out.

In the fiber assembly-forming apparatus 300, a calender roller 284 of the pressurizing portion 282, one of calender rollers 85 of a pressurizing portion 82, and one of heating rollers 86 of a heating portion 84 are located inside the mesh belt 72.

Figure 6:
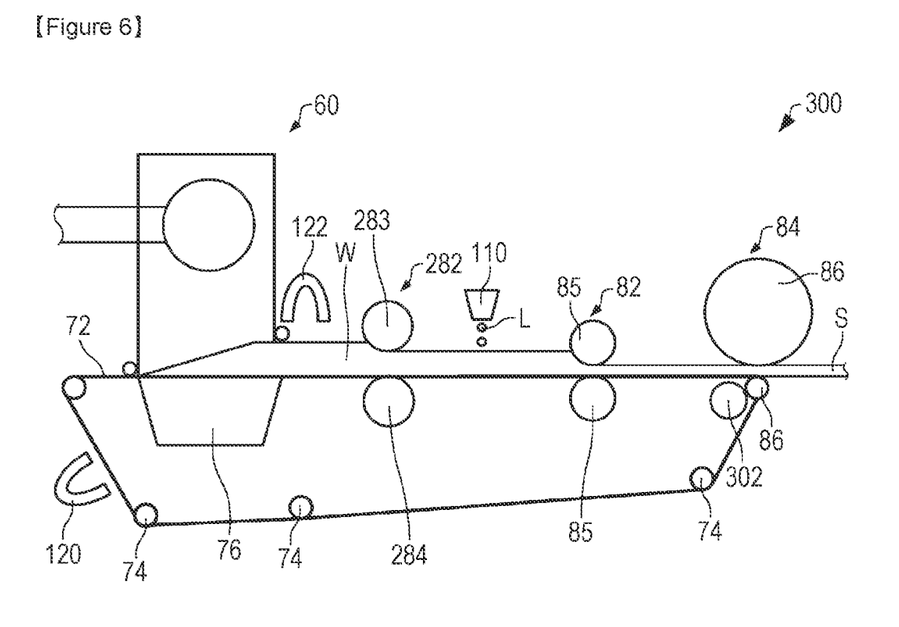
FIG. 6 is a schematic view of the fiber assembly-forming apparatus according to the second modification of the embodiment.

Incidentally, the heating roller 86 located inside the mesh belt 72 may be a separation roller with a diameter of 30 mm or less. When the heating roller 86 is the separation roller, the number of components can be reduced. In this case, a heat source heater may be placed in the heating roller 86 or the heating roller 86 may be heated by an external heat source heater 302 as shown in FIG. 6.

3. FIBER ASSEMBLY-FORMING METHOD

Figure 7:
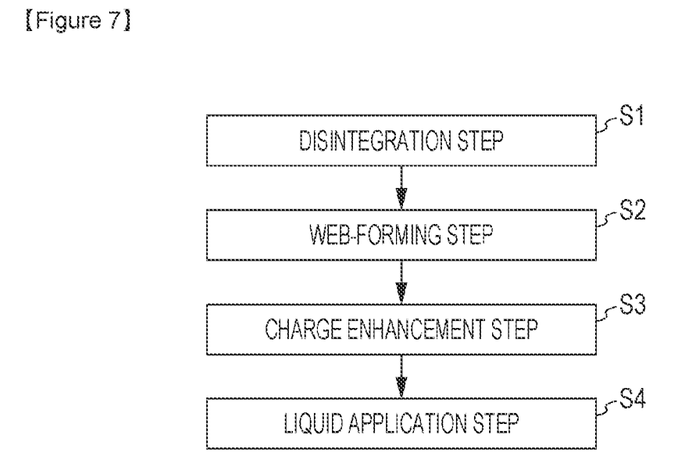
FIG. 7 is a flowchart illustrating a fiber assembly-forming method according to an embodiment of the present disclosure.

Next, a fiber assembly-forming method according to an embodiment of the present disclosure is described with reference to a drawing. FIG. 7 is a flowchart illustrating the fiber assembly-forming method.

The fiber assembly-forming method is performed using, for example, the above-mentioned fiber assembly-forming apparatus 100. The fiber assembly-forming method may be performed using an apparatus other than the fiber assembly-forming apparatus 100.

As shown in FIG. 7, the fiber assembly-forming method includes, for example, a disintegration step (Step S1) of disintegrating a feedstock containing a plurality of fibers, a web-forming step (Step S2) of forming a web W containing a plurality of positively charged fibers on a negatively charged mesh belt 72, a charge enhancement step (Step S3) of enhancing the charge of the fibers contained in the web W formed on the mesh belt 72, and a liquid application step (Step S4) of applying liquid L to the web W formed on the mesh belt 72 from a nozzle of a liquid coater 110.

The disintegration step (Step S1) is performed using, for example, the disintegration section 20 of the fiber assembly-forming apparatus 100.

In the web-forming step (Step S2), the web W is formed in such a manner that disintegrated matter obtained in the disintegration step is deposited on the mesh belt 72. The web-forming step is performed using, for example, the deposition section 60 of the fiber assembly-forming apparatus 100.

The charge enhancement step (Step S3) is performed using, for example, the charge enhancement section 122 of the fiber assembly-forming apparatus 100.

The liquid application step (Step S4) is performed using, for example, the liquid coater 110 of the fiber assembly-forming apparatus 100.

The fiber assembly-forming method may include a step of pressurizing the web W formed on the mesh belt 72 by a pressurizing portion 282 before the liquid application step. In this case, the fiber assembly-forming method may be performed using the fiber assembly-forming apparatus 200. Alternatively, the fiber assembly-forming method may be performed using the fiber assembly-forming apparatus 300.

The fiber assembly-forming method may include a step such as a step of pressurizing the web W by the pressurizing portion 82 or a step of heating the web W by the heating portion 84 as described in above-mentioned "1. Fiber Assembly-Forming Apparatus" or "2. Modifications of Fiber Assembly-Forming Apparatus" in addition to the above steps.

4. EXPERIMENT EXAMPLES

Experiments were performed using a fiber assembly-forming apparatus corresponding to the fiber assembly-forming apparatus 100 shown in FIGS. 1 and 2. Each of liquids L1 to L3 was applied to a web using an ink jet head as a liquid coater. A feedstock used was recycled paper, "G80", produced by Mitsubishi Paper Mills, Ltd.

Figure 8:
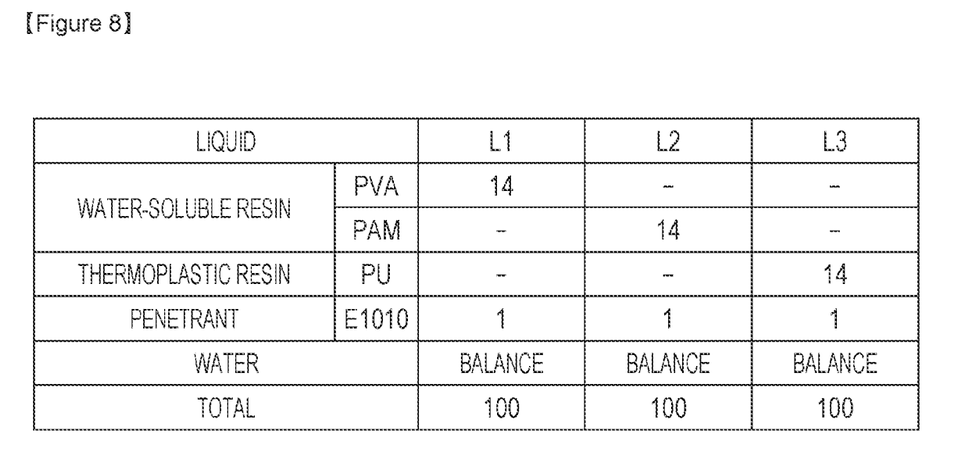
FIG. 8 is a table showing components of liquids used in experiment examples.

FIG. 8 is a table showing components of liquids L1 to L3. The unit of numbers in the table is mass percent. Water was added as a balance to give a total of 100% by mass. In the table, "PVA" is polyvinyl alcohol, PVA 117, available from Kuraray Co., Ltd.; "PAM" is polyacrylamide, DS 4352, available from Seiko PMC Corporation; "PU" is polyurethane, SUPERFLEX 460, available from Dai-ichi Kogyo Seiyaku Co., Ltd.; and "E1010" is Olfine E1010 available from Nissin Chemical Industry Co., Ltd.

Separation properties were evaluated in such a manner that the force required to separate a web coated with the liquid L1 from a mesh belt was measured. For measurement, Digital Force available from A&D Co., Ltd. Evaluation standards are as described below.

A: A web capable of being separated from the mesh belt with a force of 0.2 N or less.

B: A web capable of being separated from the mesh belt with a force of more than 0.2 N to 0.5 N.

C: A web incapable of being separated from the mesh belt with a force of 0.5 N or less.

Drying properties were evaluated in such a manner that a web coated with the liquid L1 was left in a 120° C. thermostatic chamber and the time taken for the water fraction of the web to reach 5.4% or less was measured. Evaluation standards are as described below.

A: A drying time of 30 seconds or less.

B: A drying time of more than 30 seconds to 60 seconds.

C: A drying time of more than 60 seconds.

Figure 9:
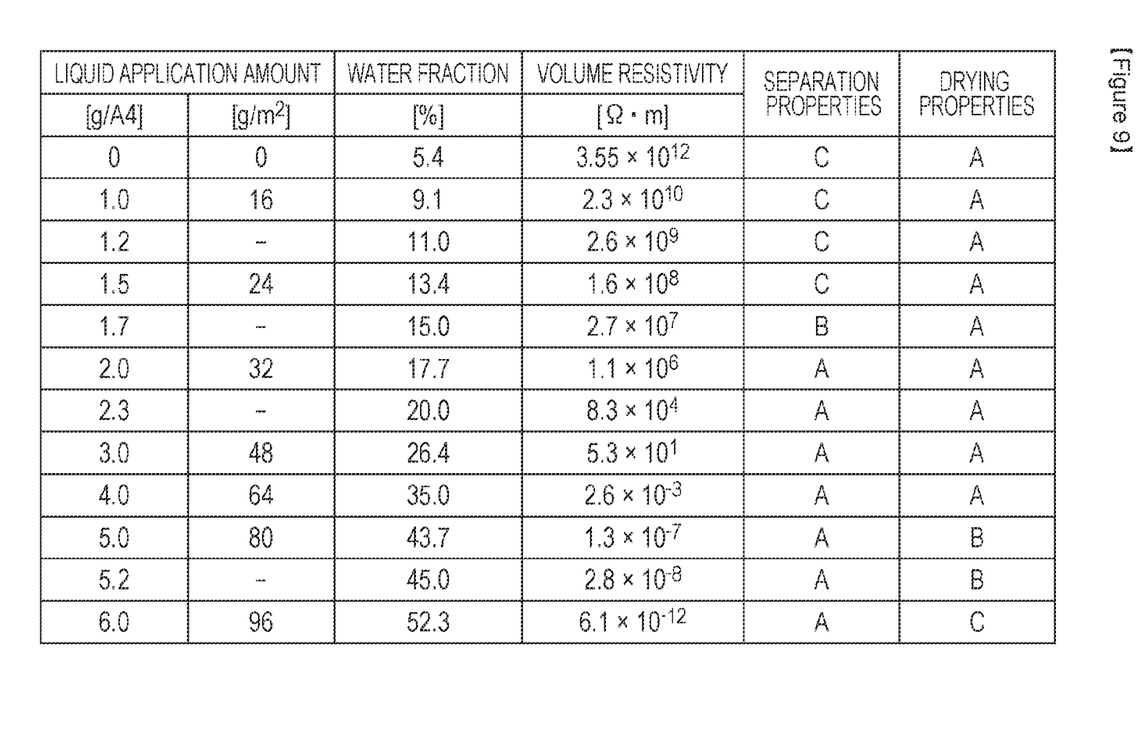
FIG. 9 is a table showing separation properties and drying properties.

FIG. 9 is a table showing separation properties and drying properties evaluated in such a manner that the water fraction of a web was varied by changing the amount of applied liquid. In this tale, "LIQUID APPLICATION AMOUNT [g/A4]" represents the amount of liquid applied per A4 size.

The water fraction in this table and the water fraction for drying properties evaluation were determined using a heat-drying moisture analyzer, MX-50, available from A&D Co., Ltd. The water fraction of 5 g of a web was measured under conditions of a standard heating pattern, a sample pan temperature of 120° C., the measurement accuracy Accuracy-MID, and an automatic end mode with a termination condition of 0.05%/min and was determined from the following equation.

$$\text{Water fraction (\%)} = (W-D)/W \times 100 \qquad (1)$$

In Equation (1), W is the mass of an undried web and D is the mass of the dried web.

The volume resistivity in this table was determined using a resistivity meter, Hiresta, available from Mitsubishi Chemical Analytech Co., Ltd. in such a manner that a voltage of 100 V was applied to a web with a thickness of 90 μm for 30 seconds.

As shown in FIG. 9, it became clear that, when the water fraction of a web coated with the liquid L1 was 15.0% or more, the web could be separated from the mesh belt with a force of 0.5 N or less. Furthermore, it became clear that, when the water fraction was 17.7% to 35.0%, the separation properties and the drying properties were better.

Incidentally, in a case where the liquid L2 or L3 was used instead of the liquid L1, results similar to those obtained using the liquid L1 were obtained because the amount of moisture was the same.

In the present disclosure, configurations may be partly omitted insofar as features and effects described in the present application are retained and embodiments and modifications may be combined.

The present disclosure is not limited to the above embodiments and various modifications can be made. The present disclosure includes, for example, substantially the same configurations as configurations described in the embodiments. Substantially the same configurations are, for example, configurations identical in function, method, and result or configurations identical in object and effect. The present disclosure includes configurations obtained by replacing nonessential portions of configurations described in the embodiments. Furthermore, the present disclosure includes configurations capable of providing the same advantageous effects as those of configurations described in the embodiments or capable of achieving the same object. Furthermore, the present disclosure includes configurations obtained by adding a known technique to configurations described in the embodiments.

What is claimed is:

1. A fiber assembly-forming apparatus comprising:
    a transport belt on which a web containing a plurality of fibers charged to a first polarity is formed, the transport belt being charged to a second polarity opposite to the first polarity; and
    a liquid coater applying a liquid to the web formed on the transport belt from a nozzle,
    wherein the liquid contains a binder binding the fibers.

2. The fiber assembly-forming apparatus according to claim 1, wherein the liquid contains water and the water fraction of the web coated with the liquid is 15.0% or more.

3. The fiber assembly-forming apparatus according to claim 2, wherein the water fraction is 17.7% to 35.0%.

4. The fiber assembly-forming apparatus according to claim 1, further comprising:
    a disintegration section disintegrating a feedstock containing a plurality of fibers; and
    a deposition section depositing disintegrated matter obtained by disintegrating the feedstock on the transport belt to form the web on the transport belt.

5. The fiber assembly-forming apparatus according to claim 1, further comprising a charge enhancement section enhancing the charge of the fibers contained in the web formed on the transport belt.

6. The fiber assembly-forming apparatus according to claim 1, further comprising a pressurizing portion pressurizing the web formed on the transport belt before the liquid is applied to the web, wherein the pressurizing portion includes a first calender roller in contact with the web and a second calender roller in contact with the transport belt, the first calender roller is charged to the first polarity, and the second calender roller is grounded.

7. The fiber assembly-forming apparatus according to claim 1, wherein the liquid coater is an ink jet head.

8. The fiber assembly-forming apparatus according to claim 1, further comprising a charging section that charges the transport belt to the second polarity.

* * * * *